United States Patent
Liu et al.

(10) Patent No.: US 11,150,674 B2
(45) Date of Patent: Oct. 19, 2021

(54) HEAD-MOUNTED DISPLAY DEVICE AND ADJUSTING METHOD THEREOF

(71) Applicant: WISTRON CORP., New Taipei (TW)

(72) Inventors: Hsueh-Teng Liu, New Taipei (TW); Tsu-Yin Jen, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/026,911

(22) Filed: Jul. 3, 2018

(65) Prior Publication Data
US 2019/0250651 A1    Aug. 15, 2019

(30) Foreign Application Priority Data
Feb. 13, 2018 (TW) .................................. 107105155

(51) Int. Cl.
  *G05D 16/20* (2006.01)
  *G01L 11/00* (2006.01)
  *G01B 11/14* (2006.01)

(52) U.S. Cl.
  CPC .......... *G05D 16/2066* (2013.01); *G01B 11/14* (2013.01); *G01L 11/00* (2013.01)

(58) Field of Classification Search
  USPC .......................................................... 345/5
  See application file for complete search history.

(56) References Cited

U.S. PATENT DOCUMENTS

| | | | | |
|---|---|---|---|---|
| 5,739,893 A | * | 4/1998 | Karasawa | G02B 27/0176 351/158 |
| 8,958,158 B1 | * | 2/2015 | Raffle | G02B 27/017 359/630 |
| 2015/0309312 A1 | * | 10/2015 | Alton | G06T 19/006 345/592 |
| 2016/0178911 A1 | * | 6/2016 | Thurber | G02B 27/0101 359/630 |
| 2017/0140224 A1 | * | 5/2017 | Wilson | G02B 27/0093 |
| 2018/0246535 A1 | * | 8/2018 | Liu | A61H 9/00 |

FOREIGN PATENT DOCUMENTS

| | | |
|---|---|---|
| CN | 206421104 U | 8/2017 |
| WO | 2017166229 A1 | 10/2017 |

OTHER PUBLICATIONS

TW Office Action dated Jun. 14, 2018 in application No. 107105155.

* cited by examiner

*Primary Examiner* — Nelson M Rosario
(74) *Attorney, Agent, or Firm* — Maschoff Brennan (57) ABSTRACT

The disclosure is related to a head-mounted display device and an adjusting method thereof. The head-mounted display device is adapted to be worn on a human face and includes a main body, a contact part and at least one airbag. The contact part is disposed on the main body, and the contact part includes a frame and a nose contact portion connected to each other. The airbag is disposed on the nose contact portion of the contact part, and the airbag is inflatable in order to decrease a gap between the nose contact portion and the human face.

9 Claims, 9 Drawing Sheets

HEAD-MOUNTED DISPLAY DEVICE AND ADJUSTING METHOD THEREOF

CROSS-REFERENCE TO RELATED APPLICATIONS

This non-provisional application claims priority under 35 U.S.C. § 119(a) on Patent Application No(s). 107105155 filed in Taiwan, R.O.C. on Feb. 13, 2018, the entire contents of which are hereby incorporated by reference.

TECHNICAL FIELD

The disclosure relates to a head-mounted display device and an adjusting method thereof, more particularly a head-mounted display device capable of eliminating the negative effects of ambient light and an adjusting method thereof.

BACKGROUND

With the development of technology, there are more and more smartphone peripheral products in the market. For example, there is a head-mounted display device that takes the smartphone as a media source and can become a portable virtual reality device (i.e. VR device) with the smartphone while running some related applications.

However, such head-mounted display device is not customized, thus it has a difficulty in fitting every user's face. When the device is loose, a large gap may occur between the device and the user's face, causing a large amount of ambient light to enter into a displaying area in the head-mounted display device and disturbing the viewing quality. On the contrary, when the device is too tight, it is uncomfortable to wear.

SUMMARY OF THE INVENTION

One embodiment of the disclosure provides a head-mounted display device. The head-mounted display device is adapted to be worn on a human face and includes a main body, a contact part and at least one airbag. The contact part is disposed on the main body, and the contact part includes a frame and a nose contact portion connected to each other. The airbag is disposed on the nose contact portion of the contact part, and the airbag is inflatable in order to decrease a gap between the nose contact portion and the human face.

Another embodiment of the disclosure provides an adjusting method of a head-mounted display device. The adjusting method includes obtaining a measurement value between a contact part of the head-mounted display device and a human face by a sensor, and determining whether the measurement value falls within a predetermined range. When the measurement value is determined to fall within the predetermined range, an inflating module is maintained in an off state. When the measurement value is determined to fall outside the predetermined range, the inflating module is activated to inflate an airbag of the head-mounted display device.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
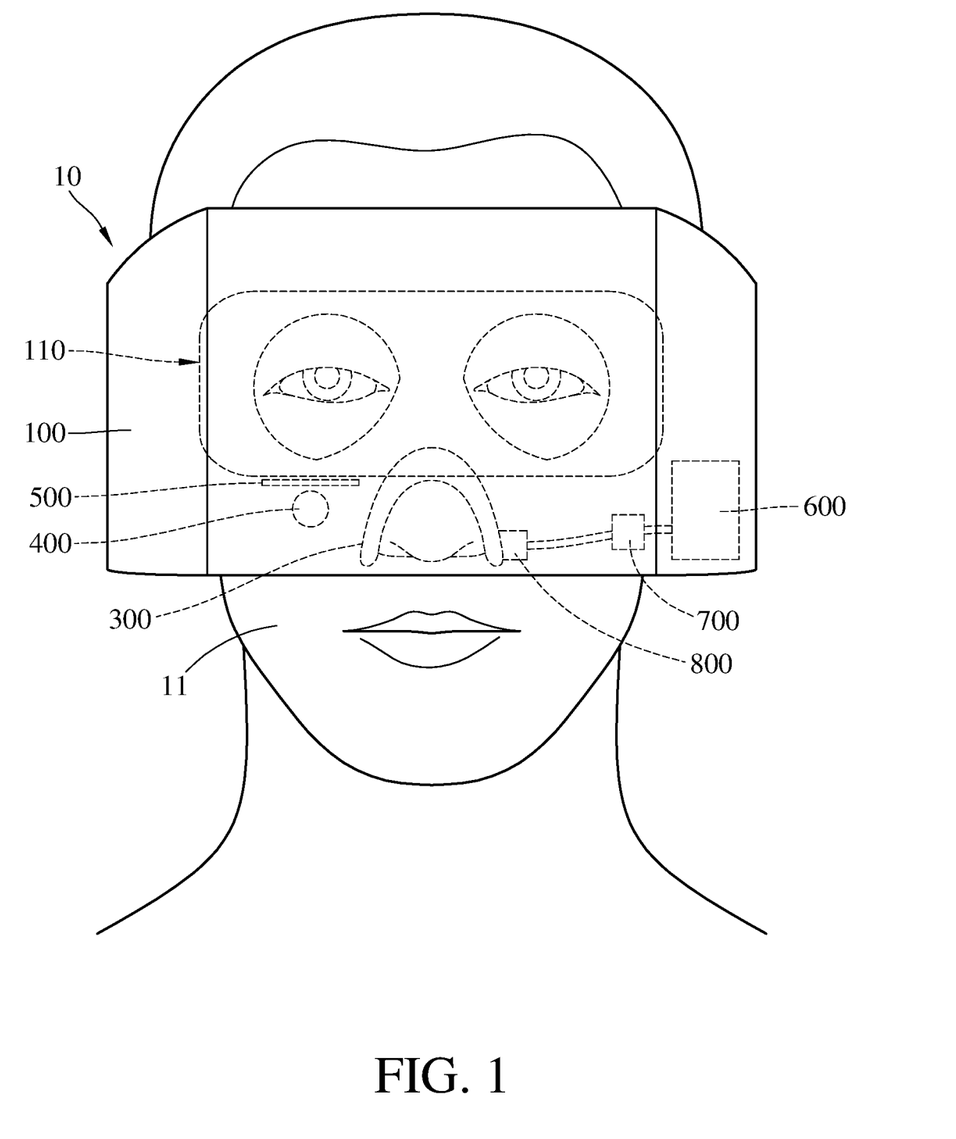
FIG. 1 is a front view of a head-mounted display device according to a first embodiment of the disclosure being worn on a user's head.
Figure 2:
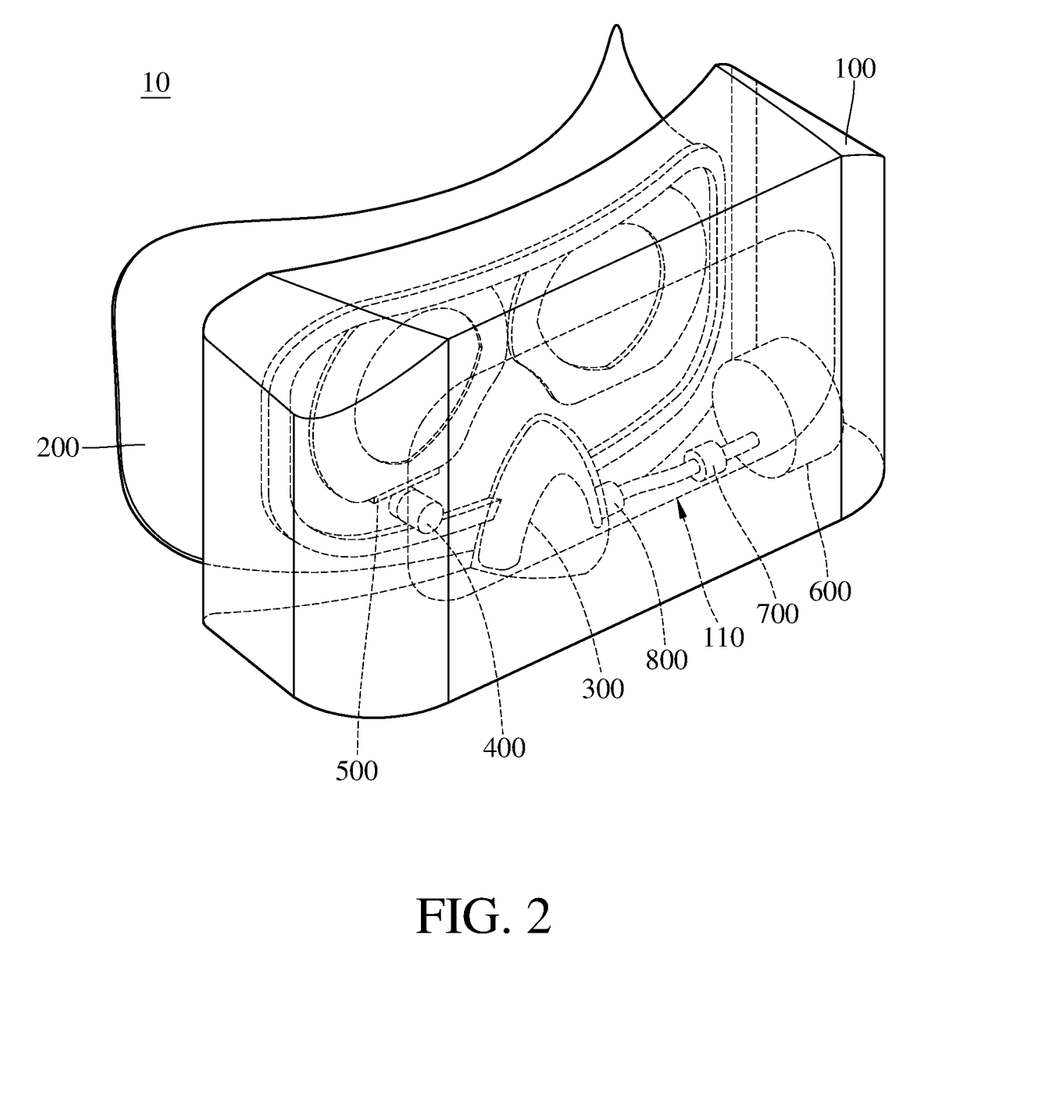
FIG. 2 is a perspective view of the head-mounted display device in FIG. 1.
Figure 3:
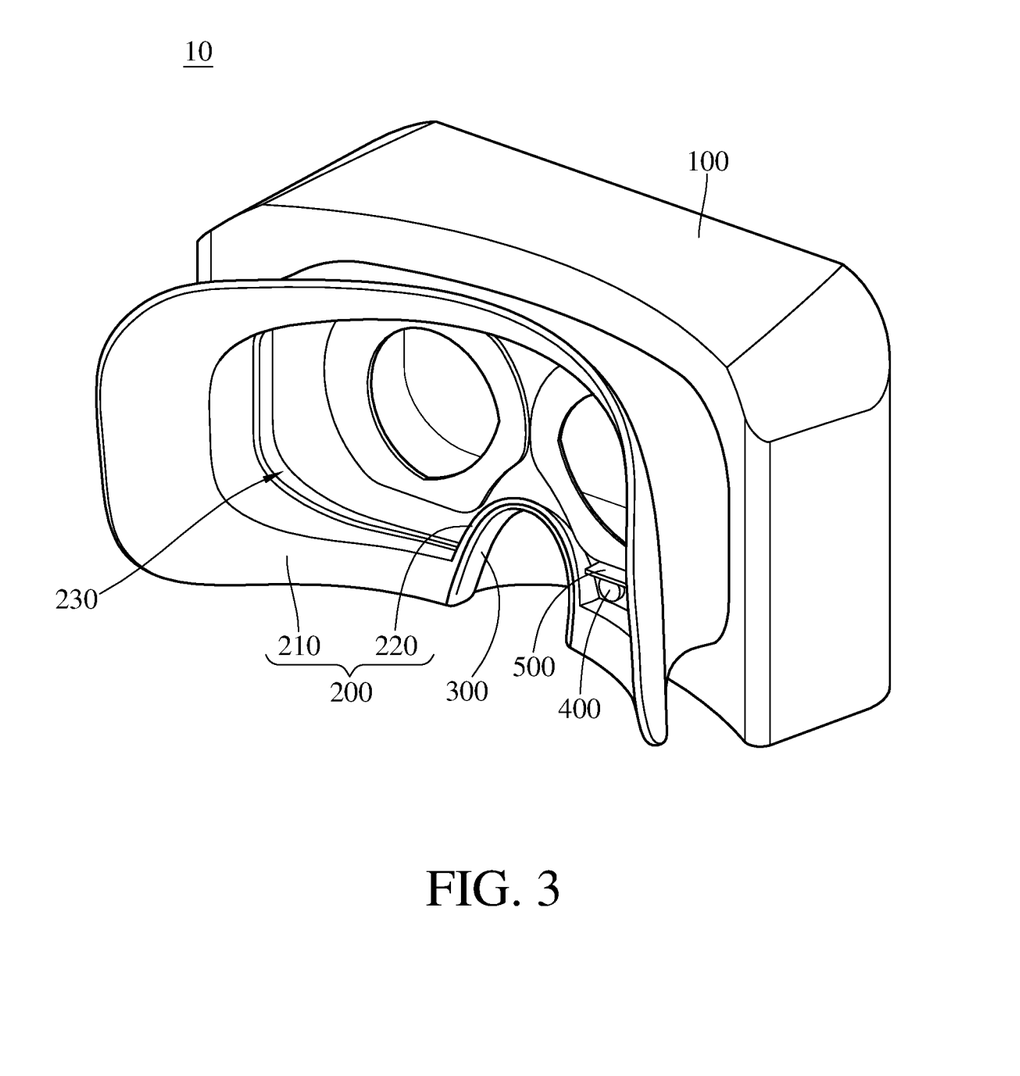
FIG. 3 is another perspective view of the head-mounted display device in FIG. 1.

Please refer to FIG. 1 to FIG. 3. FIG. 1 is a front view of a head-mounted display device according to a first embodiment of the disclosure being worn on a user's head. FIG. 2 is a perspective view of the head-mounted display device in FIG. 1. FIG. 3 is another perspective view of the head-mounted display device in FIG. 1.

In this embodiment, a head-mounted display device 10 is provided. The head-mounted display device 10 is, for example, a VR (Virtual Reality) device, and is adapted to be worn on a human face 11. The head-mounted display device 10 includes a main body 100, a contact part 200, an airbag 300, a sensor 400, a blocking member 500, an inflating module 600, a pressure detector 700 and a deflating module 800.

The main body 100 allows a smartphone (not shown) to be mounted at a display surface 110 thereof, such that one wearing the head-mounted display device 10 can see the media content on the smartphone via the display surface 110, and the one can obtain a different visual experience while running a related application.

The contact part 200 is connected to the main body 100 and is used to be in contact with the human face 11. In this embodiment, the contact part 200 includes a frame 210 and a nose contact portion 220 that are connected together. The nose contact portion 220 is, for example, a nose pocket. The frame 210 and the nose contact portion 220 together form a viewing area 230 connected to the display surface 110. As shown in FIG. 1, when the user wears the head-mounted display device 10, the frame 210 surrounds the eyes, and the nose contact portion 220 is located on the nose. The contact part 200 can block most of the unwanted ambient light and thereby prevent it from affecting the user to see the media content on the smartphone.

The airbag 300 is disposed on the exterior of the nose contact portion 220. The airbag 300 is inflatable, and it can be used to decrease a gap between the nose contact portion 220 and the nose (on the human face 11). Specifically, the airbag 300 is used to adjust the head-mounted display device 10 to one's personal fitness. It is noted that the present disclosure is not limited to the location of the airbag 300 on the nose contact portion 220. In this embodiment, the airbag 300 is disposed on the bottom side of the nose contact portion 220; in some other embodiments, the airbag may be disposed on the top side of the nose contact portion 220 and located in the viewing area 230.

The sensor 400 is, for example, a luminance sensor. The sensor 400 is disposed in the viewing area 230 and is configured to measure the luminance of the interfering light (e.g., ambient light) entering into the viewing area 230 from the gap between the nose contact portion 220 and the human face 11, but the present disclosure is not limited thereto. For example, in some other embodiments, such ambient light leakage (or also called system noise) may be determined according to the size of the gap or the contact pressure between the nose contact portion 220 and the human face 11; in the former case, the sensor may be a distance sensor which is used to measure the gap between the nose contact portion 220 and the human face 11, the greater the size of the gap, the greater the amount of the ambient light leakage; in the latter case, the sensor may be a pressure sensor which is used to measure the contact pressure between the nose contact portion 220 and the human face 11, the greater the contact pressure, the greater the fitness between the nose contact portion 220 and the human face 11, meaning fewer the amount of the ambient light leakage.

The blocking member 500 is, for example, a plastic film which is impermeable to light. The blocking member 500 is located between the sensor 400 and the display surface 110 in order to prevent the light from the smartphone (not shown) from interfering with the sensor 400, thereby ensuring the ambient light leakage measurement of the sensor 400. However, the blocking member 500 is optional. In some other embodiments, if the light from the smartphone (not shown) does not interfere with the measurement of the sensor 400, the head-mounted display device may not have such blocking member 500.

The inflating module 600 is, for example, a gas pump. The inflating module 600 is disposed on the main body 100 and connected to the airbag 300. The inflating module 600 is able to inflate the airbag 300 in order to decrease the gap between the nose contact portion 220 and the human face 11.

In this embodiment, the timing of activating the inflating module 600 to inflate the airbag 300 is determined by the level of the ambient light leakage which is measured by the sensor 400. If the ambient light leakage reaches a certain level that affects the user to see the media content on the smartphone, a controller (not shown) will automatically activate the inflating module 600 to inflate the airbag 300. In the case that the head-mounted display device has no sensor to measure the ambient light leakage, the level of the ambient light leakage may be determined by the user and the user may be able to manually activate the inflating module 600.

The pressure detector 700 is configured to detect the gas pressure in the airbag 300 in order to ensure that the gas pressure is within a normal range, i.e., not too low or too high. To prevent the airbag 300 from breaking, the gas pressure should not be greater than the maximum pressure that the airbag 300 can sustain.

The deflating module 800 is, for example, an air valve. The deflating module 800 is disposed on the airbag 300. The deflating module 800 is configured to deflate the airbag 300 in order to decrease the gas pressure in the airbag 300.

In this embodiment, the inflation and deflation of the airbag 300 are respectively conducted by two separated modules, but the present disclosure is not limited thereto. In some other embodiments, the inflation and deflation may be conducted by a single module.

In addition, the inflating module 600, the pressure detector 700 and the deflating module 800 are optional.

Then, an adjusting method of the head-mounted display device for avoiding the interference of the unwanted ambient light is described hereinafter.

Figure 4:
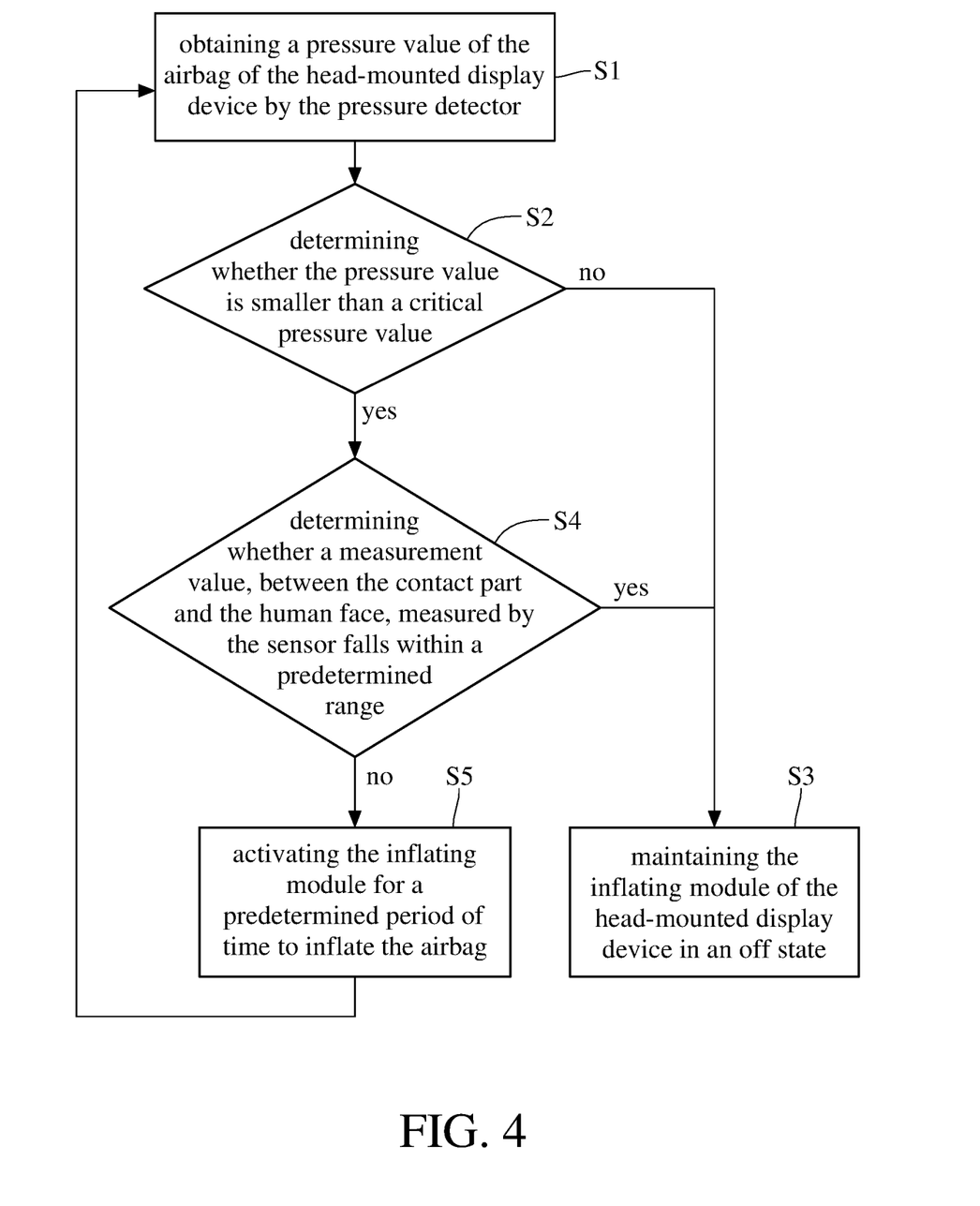
FIG. 4 is a flow chart of an adjusting method for adjusting the head-mounted display device in FIG. 1.

Please refer to FIG. 4. FIG. 4 is a flow chart of an adjusting method for adjusting the head-mounted display device in FIG. 1. An adjusting method of the head-mounted display device 10 is provided. The adjusting method includes steps S1 to S5. The step S1 includes obtaining a pressure value of the airbag 300 of the head-mounted display device 10 by the pressure detector 700. The step S2 includes determining whether the pressure value is smaller than a critical pressure value. When the pressure value is determined to be not smaller than the critical pressure value, meaning that the airbag 300 is full of gas, the step S3 is then performed. The step S3 includes maintaining the inflating module 600 of the head-mounted display device 10 in an off state. It is understood that the critical pressure is the maximum pressure that the airbag 300 can sustain.

On the other hand, when the pressure value is determined to be smaller than the critical pressure value, the step S4 is then performed. The step S4 includes determining whether a measurement value, between the contact part 200 and the human face 11, measured by the sensor 400 falls within a predetermined range. The measurement value is, for example, the luminance of the unwanted ambient light that enters into the gap between the nose contact portion 220 of the contact part 200 and the human face 11, or the size of the gap or the contact pressure between the nose contact portion 220 and the human face 11. The predetermined range is an acceptable range of the measurement value. When the measurement value is determined to fall within the predetermined range, meaning that the fitness between the head-mounted display device 10 and the human face 11 meets the fitness requirement. At this moment, the step S3 is performed to maintain the inflating module 600 to be in the off state.

On the contrary, when the measurement value is determined to fall outside the predetermined range, meaning that the fitness between the contact part 200 and the human face 11 does not meet the fitness requirement; that is, the ambient light leakage (i.e., the unwanted ambient light that enters into the gap) reaches the level that affects the user to see the media content on the smartphone. At this moment, the step S5 is then performed. The step S5 includes activating the inflating module 600 for a predetermined period of time to inflate the airbag 300. When the step S5 is finished, the step S1 and the follow up steps will be performed again. Then, the steps will be stopped when the pressure value of the airbag 300 is determined to be not smaller than the critical pressure value, or the measurement value is determined to fall within the predetermined range.

For example, when the user wears the head-mounted display device 10, the pressure detector 700 detects the pressure value of the airbag 300, and the controller of the head-mounted display device 10 then determines whether the pressure value is smaller than the critical pressure value that the airbag 300 can sustain. When the pressure value is determined to be equal to or greater than the critical pressure value, inflating the airbag 300 will cause it breaking. To prevent this, the inflating module 600 is not allowed to be activated even though the ambient light leakage occurring in the gap between the contact part 200 and the human face 11.

On the other hand, when the pressure value is determined to be smaller than the critical pressure value, the measurement value (e.g., the luminance of the unwanted ambient light that enters into the gap between the nose contact portion 220 of the contact part 200 and the human face 11, or the size of the gap or the contact pressure between the nose contact portion 220 and the human face 11) is compared with the predetermined range in order to determine whether to activate the inflating module 600.

Figure 5:
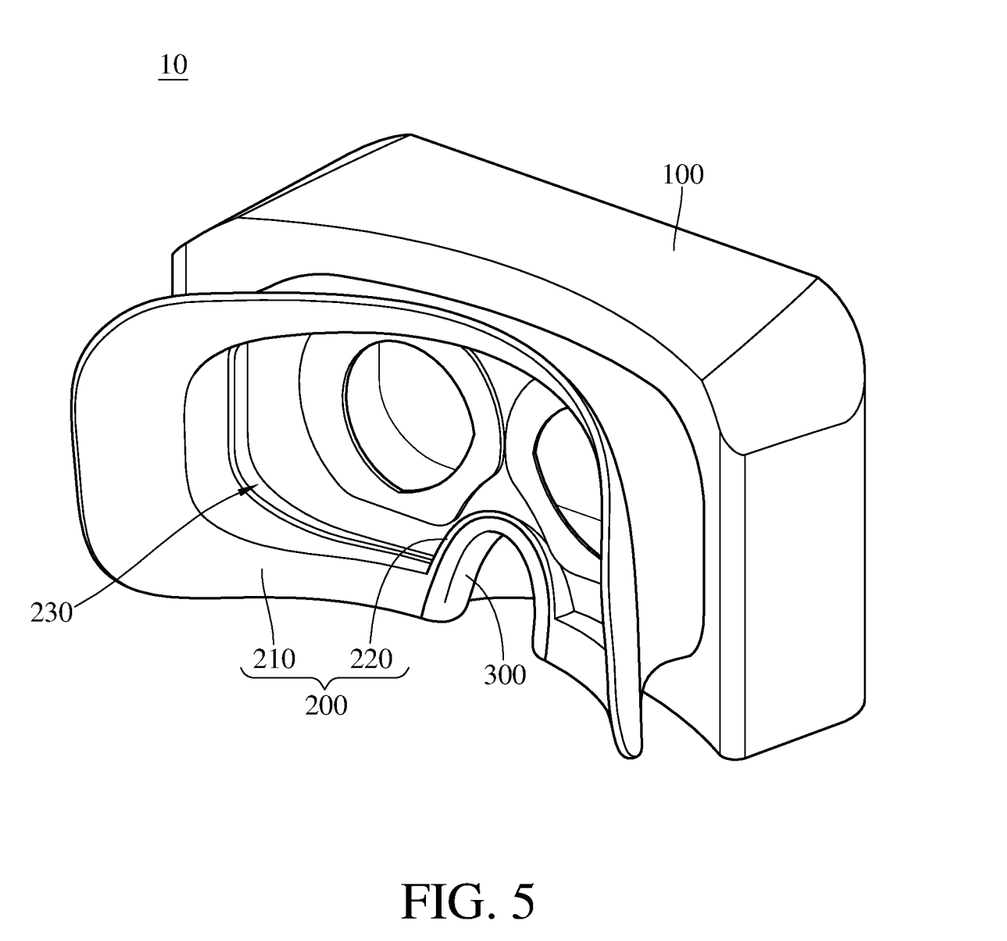
FIG. 5 is a perspective view of the head-mounted display device in FIG. 3 when an airbag is inflated.

When the measurement value is determined to fall within the predetermined range, it means that the amount of the ambient light entering into the viewing area 230 is not too much and will not disturb the user; in such a case, the inflating module 600 is maintained in the off state. On the contrary, as shown in FIG. 5, when the measurement value is determined to fall outside the predetermined range, it means that the gap between the nose contact portion 220 of the contact part 200 and the human face 11 is too big, this will cause too much ambient light to enter into the device. At this moment, the inflating module 600 is required to be activated for the predetermined period of time to inflate the airbag 300. And this situation can be shown on the smartphone to inform the user, and then the user is able to inflate the airbag 300 through a hand gesture or by pushing a button to activate the inflating module 600.

After the airbag 300 was inflated for the predetermined period of time, the aforementioned steps would be performed again. And then the steps will be stopped when the pressure value of the airbag 300 is greater than or equal to the critical pressure value, or the luminance of the unwanted ambient light is decreased to be fallen within the predetermined range.

The airbag 300 is inflatable and disposed on the nose contact portion 220 of the contact part 200, such that the gap between the nose contact portion 220 and the human face 11 is able to be decreased by inflating the airbag 300, thereby eliminating the negative effects of the unwanted ambient light and providing a better wearing comfortability.

In detail, when the nose contact portion 220 does not fit the nose (on the human face 11) and causes a gap between the nose contact portion 220 and the nose, the gap can be decreased by inflating the airbag 300 so as to block the unwanted ambient light from entering into the viewing area 230, thereby eliminating the negative effects of ambient light.

Also, the airbag 300 can be taken as a buffer between the nose contact portion 220 and the human face 11 to decrease the contact pressure on the human face 11, thereby improving the wearing comfortability.

Figure 6:
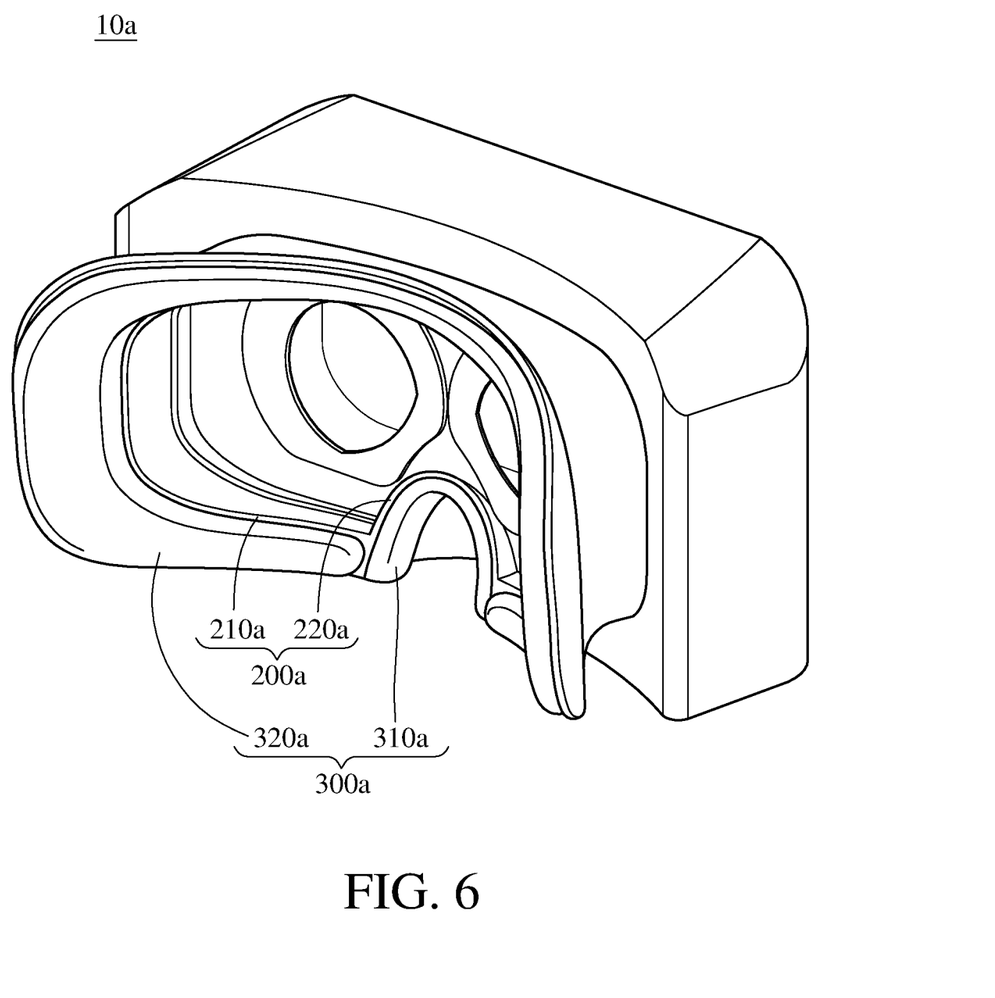
FIG. 6 is a perspective view of the head-mounted display device according to a second embodiment of the disclosure.

In the aforementioned embodiment, there is only one airbag 300 in the head-mounted display device 10, but the present disclosure is not limited thereto. Please refer to FIG. 6. FIG. 6 is a perspective view of the head-mounted display device according to a second embodiment of the disclosure.

This embodiment provides a head-mounted display device 10a. The airbag 300a includes a first airbag 310a and a second airbag 320a. The first airbag 310a is disposed on a nose contact portion 220a of a contact part 200a, and the second airbag 320a is disposed on a frame 210a of the contact part 200a.

In addition, in this embodiment, there are a plurality of sensors for measuring the luminance of ambient light entering the gap between the frame 210a and the peripheral of eyes and the gap between the nose contact portion 220a and the nose, and the first airbag 310a and the second airbag 320a would be inflated according to the result of the measurements. For example, when the gap between the nose contact portion 220a and the nose is too large, the first airbag 310a would be inflated to decrease such gap so as to decrease the level of the ambient light leakage. In the same manner, when the gap between the frame 210a and the peripheral of eyes is too large, the second airbag 320a would be inflated to decrease such gap so as to decrease the level of the ambient light leakage. As such, the first airbag 310a and the second airbag 320a are able to respectively improve the fitness between the contact part 200a and the peripheral of eyes and the nose, thereby eliminating the negative effects of the unwanted ambient light and improving wearing comfortability.

Moreover, at least one of the airbags may have more than one chamber. For example, in some other embodiments, the first airbag and/or the second airbag may have a plurality of chambers, and these chambers can be inflated and deflated separately, this allows the airbags to properly fit every user's face.

Figure 7:
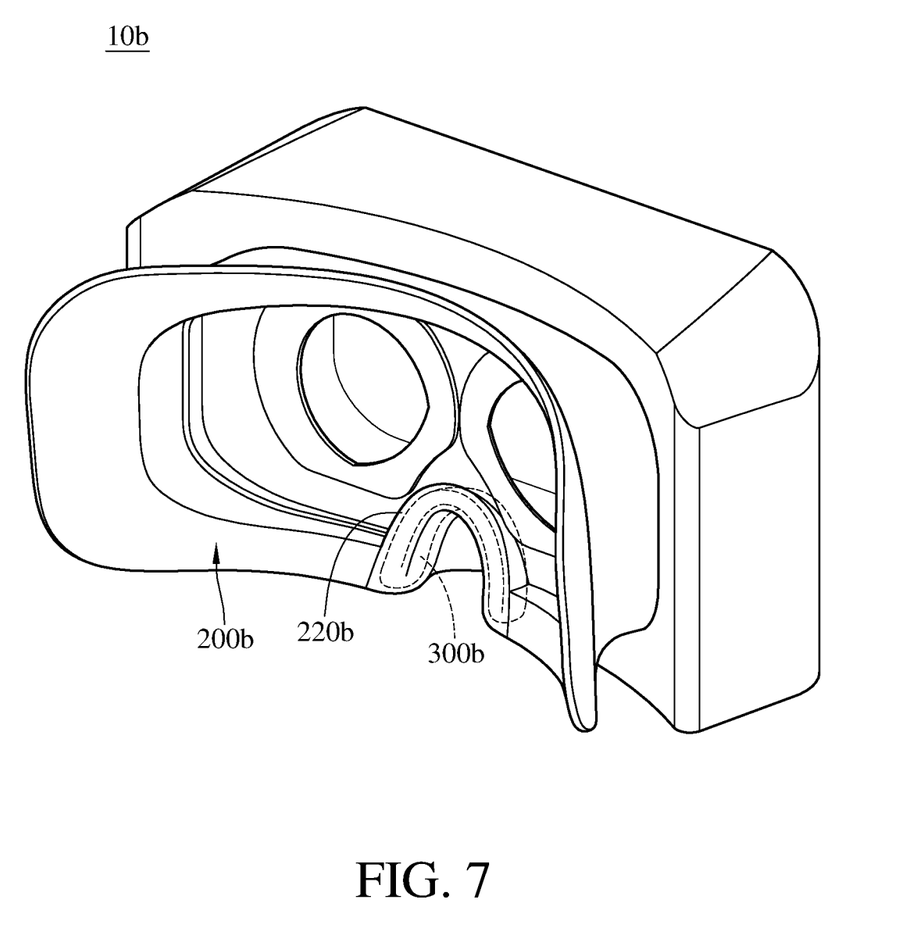
FIG. 7 is a perspective view of the head-mounted display device according to a third embodiment of the disclosure.

Then, it is noted that the location of the airbag is not restricted. Please refer to FIG. 7. FIG. 7 is a perspective view of the head-mounted display device according to a third embodiment of the disclosure.

This embodiment provides a head-mounted display device 10b. The head-mounted display device 10b includes an airbag 300b which is disposed inside a nose contact portion 220b of a contact part 200b; that is, the airbag 300b is enclosed in the nose contact portion 220b. And the inflation and deflation of the airbag 300b can force the nose contact portion 220b to move forward or away from the human face (e.g. shown in FIG. 1) so as to adjust the fitness of the head-mounted display device 10b.

Figure 8:
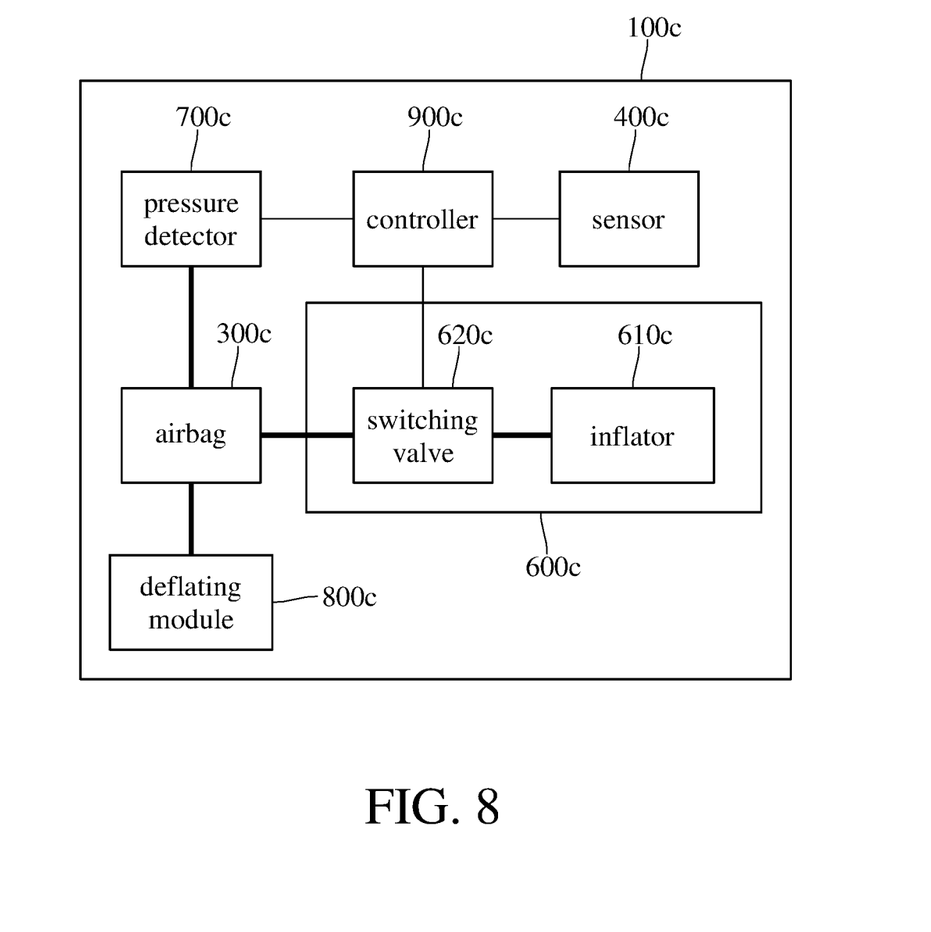
FIG. 8 is a block diagram of the head-mounted display device according to a fourth embodiment of the disclosure.

Then, please refer to FIG. 8. FIG. 8 is a block diagram of the head-mounted display device according to a fourth embodiment of the disclosure. In FIG. 8, bold lines represent the air connections between elements, and thin lines represent the electrical connections between elements.

In this embodiment, a head-mounted display device further includes a main body 100c, an airbag 300c, a sensor 400c, an inflating module 600c, a pressure detector 700c, a deflating module 800c and a controller 900c. The inflating module 600c is disposed in the main body 100c and further includes an inflator 610c and a switch 620c. The inflator 610c is, for example, an air pump. The switch 620c is located between the inflator 610c and the airbag 300c. The switch 620c is electrically connected to the controller 900c. The controller 900c is able to open or close the switch 620c.

In detail, when the pressure value of the airbag 300c is determined to be smaller than its critical pressure value, the controller 900c would receive the measurement value, between the head-mounted display device and the human face, to determine whether the measurement value falls within the predetermined range. When the measurement value is determined to fall outside the predetermined range, the controller 900c would open the switch 620c to connect the inflator 610c and the airbag 300c, thereby allowing the inflator 610c to inflate the airbag 300c.

In addition, there is a deflating module 800c configured to deflate the airbag 300c.

Figure 9:
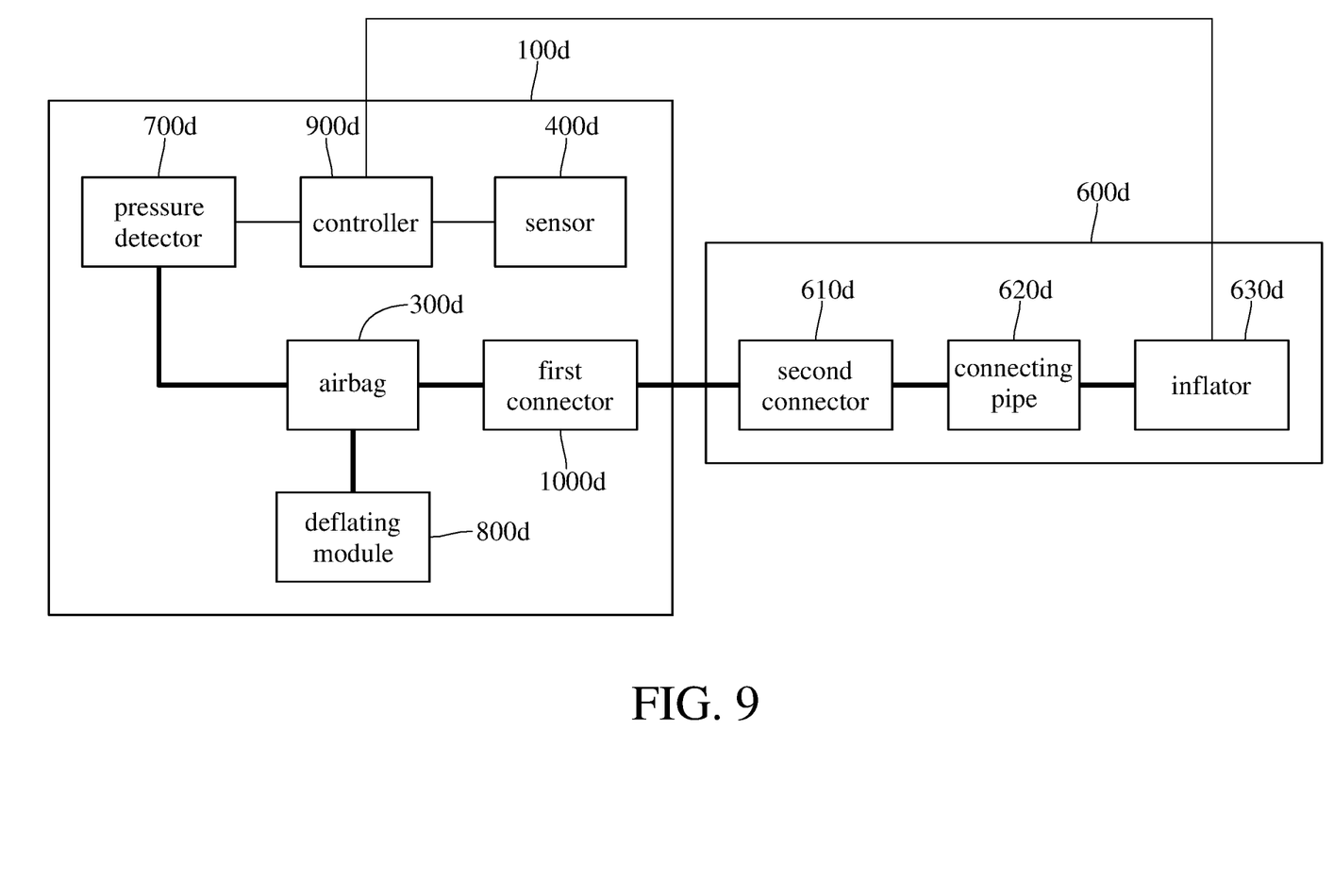
FIG. 9 is a block diagram of the head-mounted display device according to a fifth embodiment of the disclosure.

Moreover, it is noted that the location of the inflator is not restricted. Please refer to FIG. 9. FIG. 9 is a block diagram of the head-mounted display device according to a fifth embodiment of the disclosure. In FIG. 9, bold lines represent the air connections between elements, and thin lines represent the electrical connections between elements.

In this embodiment, a head-mounted display device further includes a main body 100d, an airbag 300d, a sensor 400d, an inflating module 600d, a pressure detector 700d, a deflating module 800d, a controller 900d and a first connector 1000d. The first connector 1000d is disposed on an airbag 300d, and the inflating module 600d is not disposed on a main body 100d. In detail, the inflating module 600d is detachably disposed on the main body 100d, and the inflating module includes a second connector 610d, a connecting pipe 620d and an inflator 630d. The second connector 610d is disposed on the connecting pipe 620d, and the second connector 610d is configured to be detachably connected with the first connector 1000d. The inflator 630d is, for example, an air pump, and is electrically connected to the controller 900d. The controller 900d can control the inflator 630d to inflate or not to inflate the airbag 300d through the connecting pipe 620d.

In detail, when the pressure value of the airbag 300d is determined to be smaller than its critical pressure value, the controller 900d would receive the measurement value, between the head-mounted display device and the human face, to determine whether the measurement value falls within the predetermined range. When the measurement value is determined to fall outside the predetermined range, the user can connect the second connector 610d to the first connector 1000d, and then the controller 900d would activate the inflator 630d to inflate the airbag 300d.

In addition, there is a deflating module 800d configured to deflate the airbag 300d.

Since the inflating module 600d is not disposed on the main body 100d, the user would feel lighter while wearing the head-mounted display device 10d, thereby further increasing the wearing comfortability. Similarly, adjusting the airbag 300d can also adjust the fitness of the head-mounted display device 10d.

According to the head-mounted display device and the adjusting method thereof as discussed above, the gap between the contact part and the human face is able to be decreased by inflating the airbag disposed on the contact part, thereby eliminating the negative effects of the unwanted ambient light and providing a better wearing comfortability.

In some other embodiments, there are more than one airbag disposed on the contact part to respectively decrease the gaps between the contact part and the peripheral of eyes and the nose, thereby further eliminating the negative effects of the unwanted ambient light and improving the wearing comfortability.

In addition, in some other embodiments, the airbag has a plurality of chambers that can be inflated and deflated separately; this allows the airbag to properly fit every user's face.

Moreover, in some other embodiments, the inflating module is not disposed on and separated from the main body of the head-mounted display device, thus the user would feel lighter while wearing the head-mounted display device.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A head-mounted display device, adapted to be worn on a human face, comprising:
   a main body;
   a contact part disposed on the main body, and the contact part comprising a frame and a nose contact portion connected to each other, wherein the nose contact portion is configured to be located on a nose of the human face, and the nose contact portion extends from one end of the frame to another end of the frame, and said two ends are configured to be respectively located on two sides of the nose;
   a first airbag, wherein the first airbag is enclosed in the nose contact portion and is inflatable in order to decrease a gap between the nose contact portion and the human face; and
   a sensor, wherein the sensor is a luminance sensor or a distance sensor, and the sensor is located in a viewing area formed by the frame and the nose contact portion to determine a level of a light leakage between the nose contact portion and the human face;
   wherein when the first airbag is inflated, the inflated first airbag makes the nose contact portion expand at the wings of the nose and the bridge of the nose, so a gap between the nose contact portion and the human face is able to be decreased, thereby preventing ambient light from leaking into an inside of the head-mounted display device.

2. The head-mounted display device according to the claim 1, further comprising a second airbag, wherein—the second airbag is disposed on the frame.

3. The head-mounted display device according to the claim 2, wherein at least one of the first airbag and the second airbag has a plurality of chambers.

4. The head-mounted display device according to the claim 1, further comprising an inflating module, wherein the inflating module comprises a switch and an inflator, the switch is connected to the inflator and the first airbag, and the inflator is connected to the first airbag and is configured to inflate the first airbag.

5. The head-mounted display device according to the claim 4, further comprising a first connector and a second connector, wherein the first connector is disposed on the first airbag, the second connector is disposed on the inflating module and is detachably connected with the first connector, and the inflating module is detachably disposed on the main body.

6. The head-mounted display device according to the claim 5, wherein the inflating module further comprises a connecting pipe and an inflator, the second connector is disposed on the connecting pipe, and when the first connector and the second connector are connected to each other, the inflator inflates the first airbag through the connecting pipe.

7. The head-mounted display device according to the claim 1, further comprising a pressure detector which is configured to detect the gas pressure in the first airbag.

8. The head-mounted display device according to the claim 1, wherein the first airbag has a plurality of chambers.

9. The head-mounted display device according to the claim 1, further comprising a blocking member, and the main body having a display surface, wherein the blocking member is located between the sensor and the display surface.

* * * * *